US006763098B1

United States Patent
Allen et al.

(10) Patent No.: US 6,763,098 B1
(45) Date of Patent: Jul. 13, 2004

(54) CALL BLOCKING BASED ON CALL PROPERTIES

(75) Inventors: Curtis E. Allen, Colorado Springs, CO (US); Phillip D. Crable, Falcon, CO (US); Deanna D. Willoughby, Colorado Springs, CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/087,702

(22) Filed: Jun. 1, 1998

(51) Int. Cl.[7] .............................................. H04M 17/00
(52) U.S. Cl. ........................ 379/144.03; 379/144.14; 379/114.15; 379/127.02; 379/145
(58) Field of Search ................................ 379/114, 143, 379/144, 145, 146, 155, 156, 210, 211, 201, 207, 121, 127, 189, 114.14, 114.15, 127.02, 144.01, 144.03, 188

(56) References Cited

U.S. PATENT DOCUMENTS

| | | | | |
|---|---|---|---|---|
| 5,263,080 A | * | 11/1993 | Jones et al. ............... | 379/88.19 |
| 5,563,933 A | * | 10/1996 | August et al. ......... | 379/114.01 |
| 5,694,463 A | * | 12/1997 | Christie et al. ........ | 379/221.09 |
| 5,706,338 A | * | 1/1998 | Relyea et al. | |
| 5,793,839 A | * | 8/1998 | Farris et al. | |
| 5,867,562 A | * | 2/1999 | Scherer .................... | 379/88.21 |
| 5,894,510 A | * | 4/1999 | Felger ....................... | 379/114 |
| 5,963,625 A | * | 10/1999 | Kaweeki et al. ............ | 379/114 |
| 6,075,854 A | * | 6/2000 | Copley et al. .............. | 379/211 |
| 6,148,070 A | * | 11/2000 | Meek et al. ................ | 379/210 |
| 6,157,707 A | * | 12/2000 | Baulier et al. .............. | 379/189 |
| 6,163,604 A | * | 12/2000 | Baulier et al. .............. | 379/189 |
| 6,188,753 B1 | * | 2/2001 | Afsar et al. ............ | 379/114.14 |
| 6,307,926 B1 | * | 10/2001 | Barton et al. .......... | 379/114.03 |
| 6,373,935 B1 | * | 4/2002 | Afsar et al. ................. | 379/145 |

* cited by examiner

Primary Examiner—Curtis Kuntz
Assistant Examiner—Barry W Taylor

(57) ABSTRACT

Non-toll calls originating from payphones may be blocked. An intelligent node is provided within the telecommunications network to identify whether a non-toll call originated from a payphone. The intelligent node may apply a number of different criteria to determine whether to block a non-toll call that is determined to have originated from a payphone. The intelligent node may be customized to apply criteria based upon customer request. The customer may also identify additional processing that is to be performed when a call is to be blocked.

41 Claims, 6 Drawing Sheets

CALL BLOCKING BASED ON CALL PROPERTIES

TECHNICAL FIELD

The present invention relates generally to telecommunications systems and more particularly to a method and system for performing call blocking based upon call properties.

BACKGROUND OF THE INVENTION

Payphones may be utilized in a number of different ways. In the traditional approach, a caller deposits coins in a coin slot on a payphone to cover the cost of placing a call. After depositing the coins, the caller dials the desired telephone number to initiate the phone call. The amount of money that needs to be deposited in the coin slot depends upon the nature of the call. Long distance calls generally require more money to be deposited than local calls. A portion of the deposited money is given to the payphone owner to cover the cost associated with a wear-and-tear on the payphone and to provide some profit.

Payphones, however, are being increasingly used to place telephone calls in other ways. Callers are increasingly placing non-toll calls which do not always require the caller to deposit coins in the coin slots of the payphones. Examples of such non-toll calls include toll-free 8XX calls, calling card calls, collect calls and operated-assisted "billed-to-third party" calls. With each of these types of calls, no portion of the revenue obtained for the call is shared with the payphone owner. As a result, payphone owners have objected to the allocation of revenues resulting from such non-toll calls. The Federal Communications Commission (FCC) recently issued a mandate that requires reimbursement of the owner of payphones for non-toll calls. Thus, inter-exchange carriers (IXCs) must pay a surcharge to payphone owners each time a call originates from a payphone. This charge is passed on to the customers that request toll-free number service. Given that these parties are already paying to provide such toll-free number service, the need to pay the surcharge can be especially frustrating.

SUMMARY OF THE INVENTION

The present invention provides a way for minimizing the need to pay such surcharges by facilitating the blocking of calls originating from payphones. More generally, the present invention facilitates the blocking of calls based upon properties of the call. "Blocking, in this context, refers to preventing a call from completing. Calls may be blocked based upon characteristics of the call initiation site, including the geographic location of the call initiation site. The blocking of calls may be based upon additional call properties, such as when the call was initiated (time of day, day of the week, day of the year, etc.).

The present invention may be especially useful to customers that run toll-free number services, such as 8XX services. Many of these customers may not wish to be forced to reimburse payphone owners for calls originating from payphones. Thus, they may wish to block phone calls that originate from payphones. The present invention provides a mechanism for performing such blocking of calls.

Each customer may have the option to select which criteria is to be applied in determining whether a given call should be blocked. Examples of criteria include type of call, the identity of the payphone from which the call was initiated, geographic location of the payphone from which the call was initiated, time of day at which the call was initiated, day of the week at which the call was initiated, day of the year at which the call was initiated, rate of charges by the payphone and the like. These criteria may be applied separately, in combination or in any order when in making the determination whether to block a call.

In one embodiment of the present invention, a switch submits a query to a service control point (SCP). The query encapsulates an automatic number identification (ANI) for the site from which the call originated. The query also includes information that identifies whether the phone call originated from a payphone or not. If the query indicates that the call originated from a payphone, the SCP consults a database that is accessed by dialed number. The information obtained is used to determine what condition if any must be checked to determine if the call should be blocked. The SCP then makes a decision (based on the information in the database) regarding whether the call should be blocked and includes an indication of this decision in a communication that is passed back to the switch. The switch then blocks or routes the call to the appropriate destination as instructed by the communication from the SCP.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention provides intelligence at a service control point (i.e. a "data access point") for determining whether a non-toll call originating from a payphone should be blocked or not. This allows customers who provide non-toll calling services to block calls originating from payphones and, thus, avoid having to pay surcharges to owners of the payphones. Examples of non-toll calls that do not require money to be deposited into the payphone include toll-free 8XX calls, calling card calls, operated-assisted "bill-to-third-party" calls, and collect calls. A customer may select what criteria is to be applied in determining whether a call from a payphone should be blocked or not. A "customer" refers to the party to which non-toll calls are to be charged. A customer may choose to block any or all calls originating from payphones. Moreover, the customer may choose to block only calls originating from payphones in a selected geographic region (e.g. a given state or NPA area code) or calls originating from a given local exchange. In addition, calls associated with particular originating telephone numbers may be blocked. Further, calls may be blocked based on time of day, day of the week, day of the year and rate information. For purposes of the discussion below, these criteria will be referred to as "call properties. In general, the present invention provides the ability to block calls based upon call properties.

It should be appreciated that the customer need not select a single call property to be used in determining whether to apply blocking. Multiple call properties may be examined to determine whether a call is to be blocked. The call properties may be examined in any order and such call properties may be examined multiple times (i.e. at different stages) to determine if the call is to be blocked. The illustrative embodiment of the present invention includes an interface for allowing a customer to specify such call properties. This interface will be described in more detail below.

For purpose of the discussion below, a "service control point" (SCP) is a database system that contains intelligence to screen digits of a call and route calls to appropriate destinations. A data access point (DAP) is a type of SCP implemented by MCI Communications Corporation. A number of possible different implementations of a SCP may be used to practice the present invention.

Figure 1:
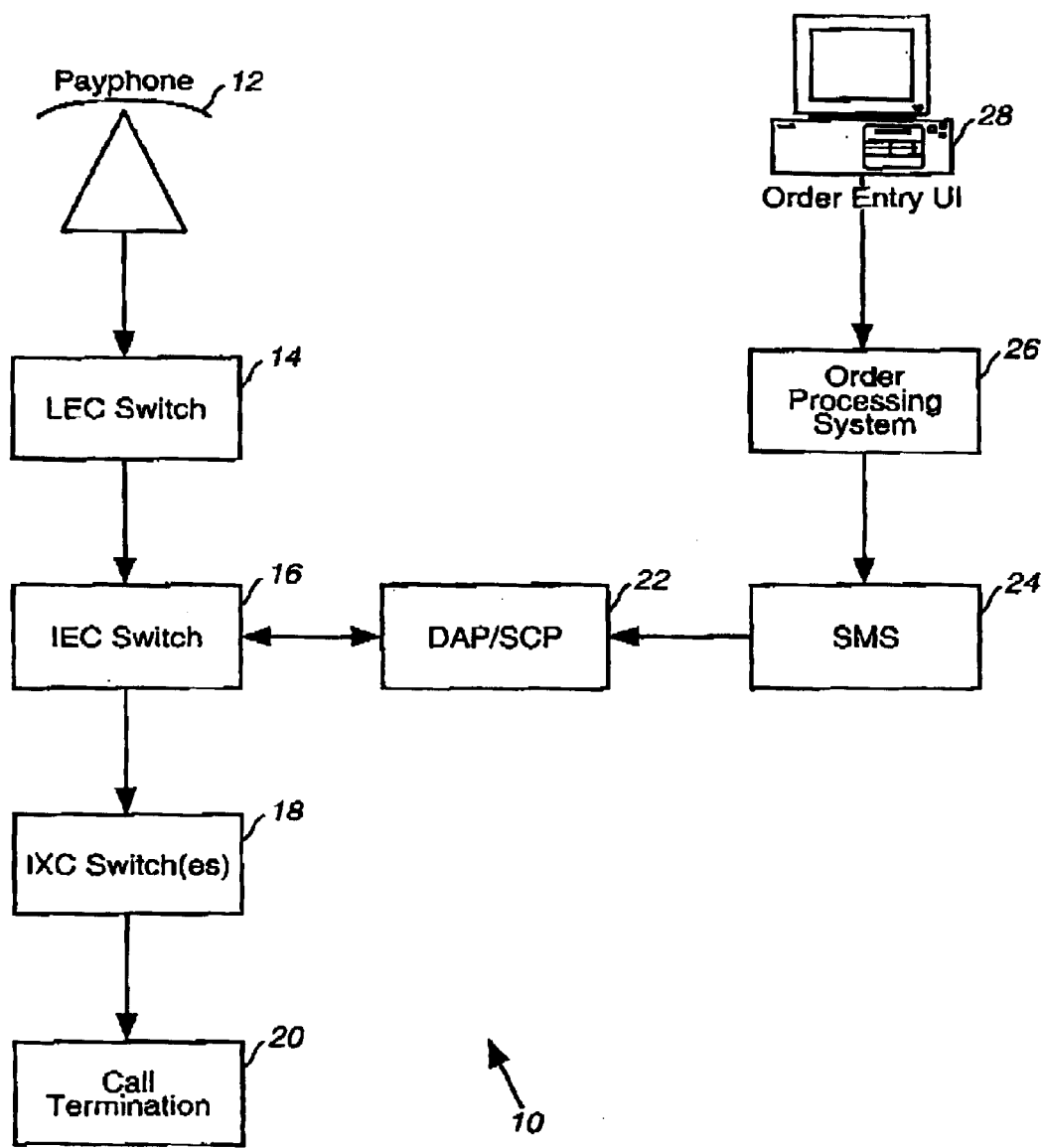
FIG. 1 is a block diagram of a telecommunication system that is suitable for practicing the illustrative embodiment of the present invention.

FIG. 1 is a block diagram that illustrates a telecommunications network 10 suitable for practicing the illustrative embodiment of the present invention. The telecommunications network 10 may include one or may payphones 12 that are connected to a local exchange carrier (LEC) network, that includes a LEC switch 14. The LEC switch 14 is responsible for routing calls to and from the payphone 12. The LEC switch 14 may connect the call to an interexchange carrier (IXC) switch 16 that is part of an IXC network. With typical long distance call routing, the IXC switch 16 routes the call through other IXC switches 18 until the call is directed to the appropriate call termination point 20. Any of a number of different types of digital switches may be used as the LEC switch 14 and IXC switches 16 and 18.

Figure 2:
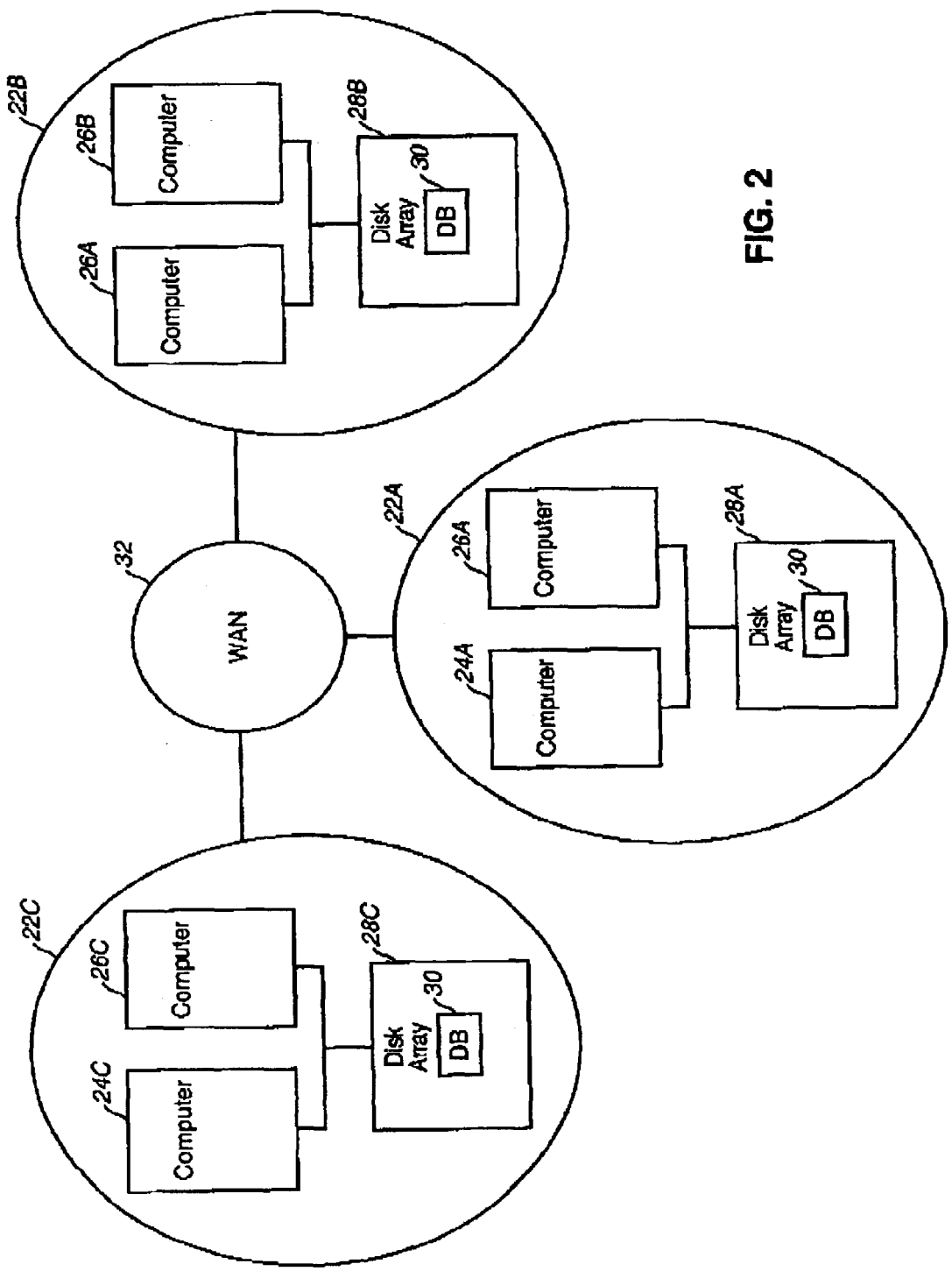
FIG. 2 is a block diagram illustrating the logical organization of data access points in the illustrative embodiment of the present invention.

The telecommunications network 10 may include a DAP 22. The DAP 22 assists the IXC switch 16 in handling calls, as will be described in more detail below. In general terms, the DAP 22 is a computing platform that includes a database and runs call processing application software. In the illustrative embodiment of the present invention, the DAP 22 has a database that holds information regarding how calls should be processed. DAP 22 and IXC switch 16 communicate with each other over a network, such as an X.25 network. The telecommunication system 10 may include multiple redundant DAPs 22. FIG. 2 illustrates an example of organization for the redundant DAPs. Each DAP is implemented as a cluster (i.e., a logical grouping of computer resources) that includes multiple computers. The computers in a cluster share a common disc array for holding a database. The database is cached memory for performance reasons. In the example shown in FIG. 2, three clusters 22A, 22B and 22C are interconnected by a wide area network (WAN) 32. Cluster 22A includes computers 24A and 26A; cluster 22B includes computers 26A and 26B; and cluster 22C includes computers 24C and 26C. Each cluster 22A, 22B and 22C includes an associated disc array 28A, 28B and 28C, respectively. Each disc array 28A, 28B and 28C holds a redundant copy of database 30.

Those skilled in the art will appreciate that the present invention need not be practiced with redundant clusters.

Moreover, those skilled in the art will appreciate that the present invention may be practiced with a number of different types of computing platforms. Furthermore, each cluster may include a different number of computer and storage resources than those shown in FIG. 2. The storages need not be disc arrays but may be other storage mediums. Still further, the information necessary to make call blocking decisions need not be stored in a single database, but rather may be stored in multiple databases.

The telecommunications network 10 of FIG. 1 also includes a service management system (SMS) 24 that is responsible for populating the copies of the database 30 with appropriate customer order information so that the appropriate call properties are used in making call blocking decisions. This populating of the database 30 will be described in more detail below. The SMS 24 is coupled to an order processing system 26 that downloads orders to the SMS 24. The order processing system 26 is connected to an order entry user interface 28 that is used by customers or customer service representatives to enter customer order information regarding what call properties should be used in making a decision whether to perform call blocking.

Those skilled in the art will appreciate that the layout of the telecommunications network 10 shown in FIG. 1 is intended to be merely illustrative and not limiting of the present invention. The switches 14, 16, 18 may generally be replaced by any type of routing elements that are capable of appropriately directing calls. These routing elements need not be digital switches. In addition, the functionality performed by the DAP 22 may be performed by an intelligent node that may process call processing queries from a switch/routing element, as will be described in more detail below.

Figure 3:
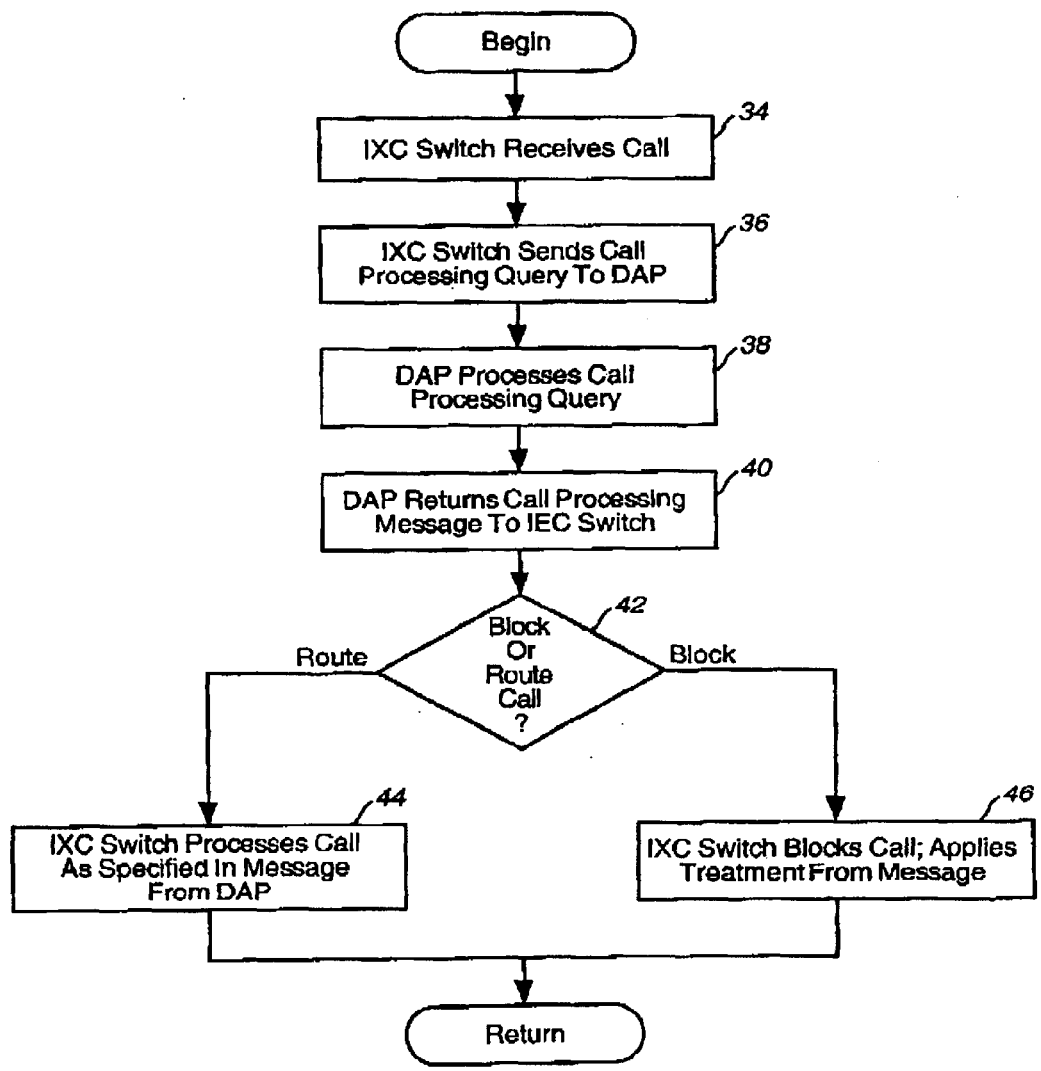
FIG. 3 is a flow chart that illustrates the steps that are performed to process an incoming call in accordance with the illustrative embodiment of the present invention.

FIG. 3 is a flow chart that illustrates the steps that are performed in determining whether to block a call that originates from a payphone in the illustrative embodiment of the present invention. Initially, a call originates from a payphone 12 and passed to an LEC switch 14. If the number dialed is a long distance call, the LEC switch passes the call to IXC switch 16. Toll-free calls are processed as long distance calls, and thus, are passed to the IXC switch 16. The IXC switch 16 receives the call (step 34 in FIG. 3) and determines if a query to the DAP 22 is required. A query is required if the call is a special service call. Special service calls include special area code calls (e.g. "800/888" and "900" calls), calling card calls, virtual private network calls and local calls that require local number portability processing. The IXC switch 16 relies upon the DAP 22 to advise the IXC switch how to handle such calls. The special services calls are identified by the IXC switch 16 based upon the dialed number and the origination type (e.g. switched feature group D (FGD), dedicated access line DAL, etc.).

The IXC switch 16 formulates a query (when needed) to forward to the DAP 22. The information included in the query is obtained by the IXC switch 16 as a matter of course. The query includes the telephone number that was dialed, the automatic number identification (ANI) of the call origination site, information regarding call origination type, , information digits and other information. The information digits are a numeric code that identifies the type of call. These information digits are used to determine whether the call originated from a payphone. After the query is properly formulated, the query is sent by the IXC switch 16 to the DAP 22 (step 36 in FIG. 3). The DAP 22 receives the query and processes the query to determine how the call should be handled (step 38 in FIG. 3). The processing of the query by the DAP will be discussed in more detail below relative to FIG. 4. In general, the DAP 22 accesses a database that holds information regarding call properties that should be examined in making the determination whether to block the call. Based on the information in the database, the DAP 22 makes a decision whether to block the call. The decision whether to block the call is encapsulated in a call processing message or communication that is sent from the DAP 22 to the IXC switch 16 (step 40 in FIG. 3).

Based upon the call processing message sent from the DAP, the IXC switch 16 blocks or routes the call (see step 42 in FIG. 3). If the message indicates that the call should not be blocked, the IXC switch processes 16 the call in accordance with routing information that is contained in the message that was sent from the DAP 22 (step 44 in FIG. 3). For example, for a 800 number call that is not to be blocked, the DAP 22 returns the address to which the call is to be routed in the call processing message. For the example shown in FIG. 1, the address is associated with the call termination point 20. In contrast, if the call processing message indicates that the call is to be blocked, the IXC switch 16 blocks the call and then subjects the call to the appropriate treatment for blocking the call (step 46 in FIG. 3). The treatment that is applied in blocking the call will be described in more detail below. In general, a customer may specify the treatment that is desired.

Figure 4:
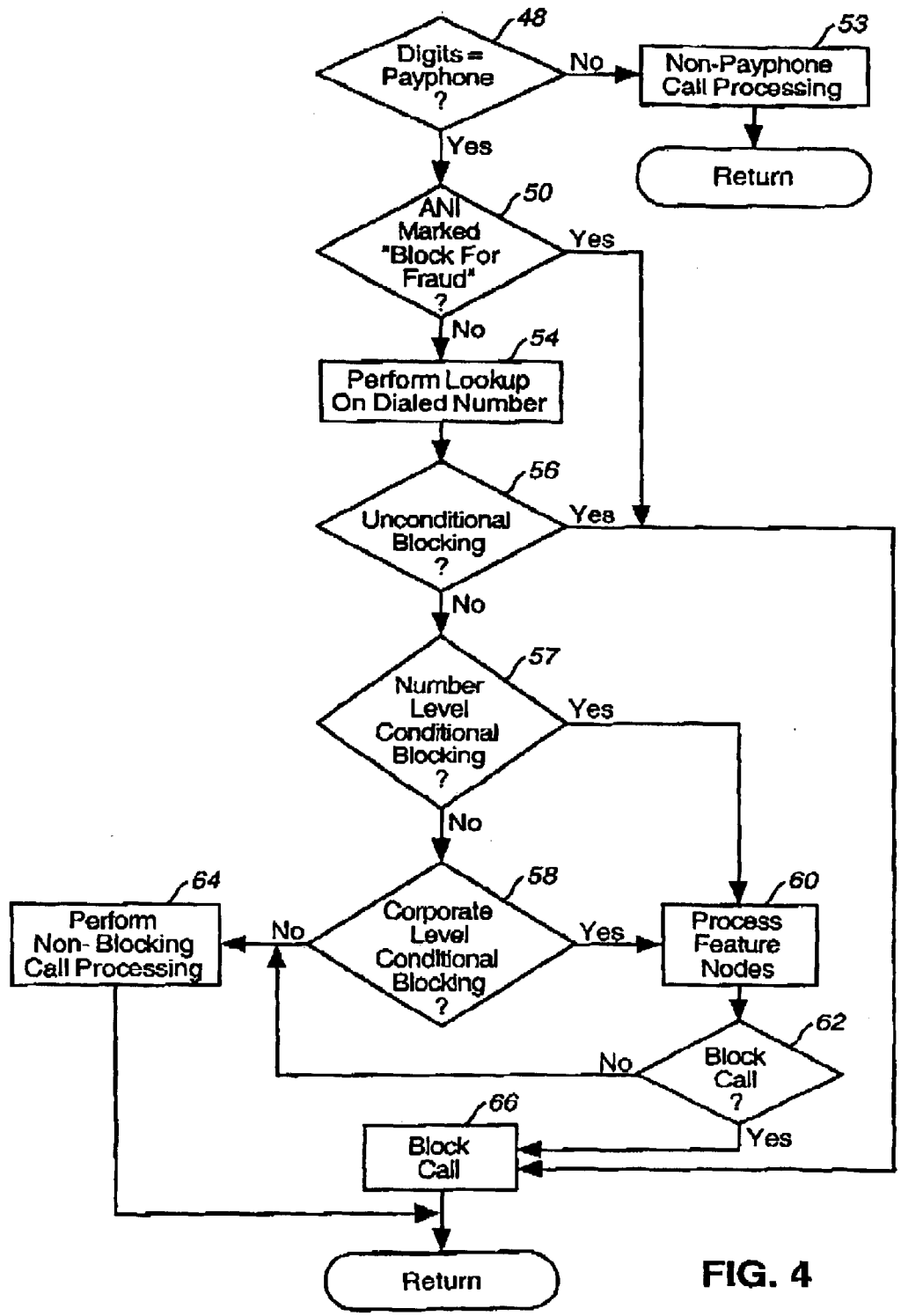
FIG. 4 is a flow chart that illustrates the steps that are performed to process a query by a data access point.

FIG. 4 is a flow chart that illustrates the steps that are performed by the DAP 22 in processing a query from IXC switch 16. The processing begins by the DAP 22 examining the information digits that are passed as part of the message that is sent from the IXC switch 16. The information digits identify whether the call originated from a payphone or not. In particular, a value of "27" or "70" indicates that the call originated from a payphone (see step 48 in FIG. 4). In instances where the information digits indicates that the call did not originate from a payphone, non-payphone call processing is performed (see step 53 in FIG. 4). In general, the DAP 22 returns information regarding where to route such non-payphone calls. (Those skilled in the art will appreciate, that the nature of the origination site may be encoded in ways other than in the numeric information digits. The information may be expressed textually or may be associated with an ANI value).

If the information digits indicate that the call originated from a payphone (see step 48 in FIG. 4), the DAP 22 begins the process of determining whether to block the call or not. Initially, the DAP 22 examines the ANI passed in the query from the IXC switch 16. The DAP 22 compares this ANI against a list of ANIs in the database 30 that have been marked as having a high potential for fraud (see step 50 in FIG. 4). In the present instance, the ANIs that have a high potential for fraud are payphones that have a historical record of being used fraudulently. If the ANI appears on this list, the call is blocked (step 66 in FIG. 4).

If the ANI of the call origination site is not on the list that identifies sites having a high probability for fraud, the DAP 22 performs a look-up of information for the dialed number in the database 30 (step 54 in FIG. 4). The dialed number serves as an index to access the blocking criteria to be applied for the associated customer. Tables within the database hold a parameter that indicates whether unconditional blocking is to be performed or not. This parameter is examined to determine if unconditional blocking is to be performed for the dialed number (step 56 in FIG. 4).

Unconditional blocking implies that calls originating from payphones to this customer number are unconditionally blocked. In such instances, calls are always blocked (step 66 in FIG. 4). In the illustrative embodiment of the present invention, conditional call blocking may take place at two levels: the number level or the corporate level. At the corporate level, calls are conditionally blocked for multiple toll-free phone numbers of a single corporation. At the number levels, calls are blocked on a per number basis for a single toll-free phone number. If it is determined that the blocking is not unconditional, a database parameter is examined to determine if number level conditional blocking is to be performed (see step 57 in FIG. 4). If so, feature nodes within the database 30 need to be accessed (step 60 in FIG. 4). The feature nodes identify call properties that are to be examined in determining whether to block the call or not. If number level conditional blocking is not invoked, database parameters are examined to determine if corporate level conditional blocking is to be performed (see step 58 in FIG. 4). If so, feature nodes are examined (step 60 in FIG. 4). Otherwise, non-blocking call processing is performed (step 64 in FIG. 4).

In order to gain a better appreciation of feature nodes, it is helpful to briefly review the organization of the database 30 in the illustrative embodiment of the present invention. The database 30 within the DAP 22 employs relational database technology. It contains a number of different tables that are used for various call processing feature lookups, such as time of day routing and day of week routing. The features are represented as nodes, known as feature nodes, as part of a call processing tree. The feature nodes are examined to determine what call properties are to be scrutinized in making the decision whether to block the call.

Figure 7:
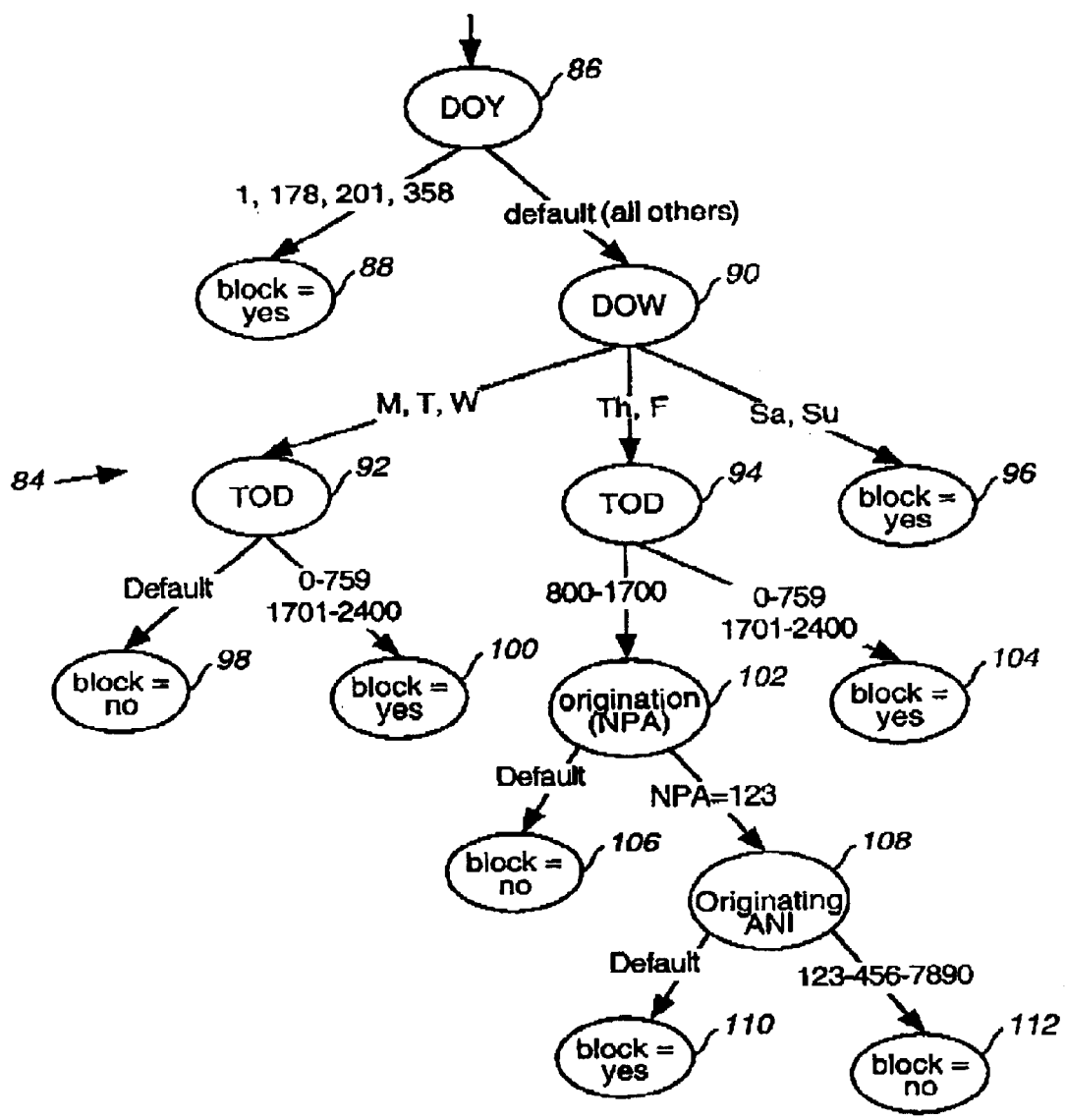
FIG. 7 illustrates an example of a call processing tree used in the illustrative embodiment of the present invention.

FIG. 7 shows an example of a call processing tree. The tree is traversed beginning with the root node and following the arches until a leaf node is reached. In the example shown in FIG. 7, the DAP 22 begins the processing by examining the day of the year (DOY) at which the call originated (see node 86 in FIG. 7). If the day is day 1, 179, 201, or 358 (in a year that is enumerated from day 1 to day 365), the call is blocked (see node 88 in FIG. 7). In all other instances, the processing continues at node 90 in FIG. 7. Node 90 is associated with the call property of the day of the week (DOW) on which the call originated. If the call originated on Saturday or Sunday, the call is blocked (see node 96 in FIG. 7). If the call originated on Monday, Tuesday, or Wednesday, the time of day (TOD) at which the call originated must be examined (see node 92 in FIG. 7). If the call originated between 8 a.m. and 5 p.m. (as indicated by 800/1700) blocking is not performed (see node 98 in FIG. 7). At all other times on Monday, Tuesday or Wednesday, the call is blocked (see node 100 in FIG. 7).

If the call originated on Thursday or Friday, the time of day (TOD) at which the call originated must be scrutinized (see node 94 in FIG. 7). If the call originated at a time other than between 8 a.m. and 5 p.m., the call is blocked (see node 104 in FIG. 7). In instances where the call originated between 8 a.m. and 5 p.m., the area code of the origination site is preferably scrutinized (see node 102 in FIG. 7). If the area code is "123" the originating ANI is examined (see node 108 in FIG. 7). The call is blocked (see node 110 in FIG. 7) unless the ANI for the call is "456-7890" (see node 112 in FIG. 7). All other calls are not blocked (see node 106 in FIG. 7).

As the example in FIG. 7 indicates, a number of different call properties may be applied in determining whether to block a call or not.

Those skilled in the art will appreciate the database need not be a relational database but may be another variety of database. For example, an object oriented database may be utilized. Moreover, the blocking criteria as represented by the call properties need not be applied using a call processing tree. Alternative implementation may be utilized. In addition, the data may be stored in multiple databases.

Those skilled in the art will also appreciate that criteria other than those specified in FIG. 7 may be applied in determining whether to block a call or not. In the general case, properties associated with the call (including the origination line information) may be applied to determine whether to block a call or not. The present invention is not limited to instances where blocking is applied exclusively to payphones.

Figure 5:
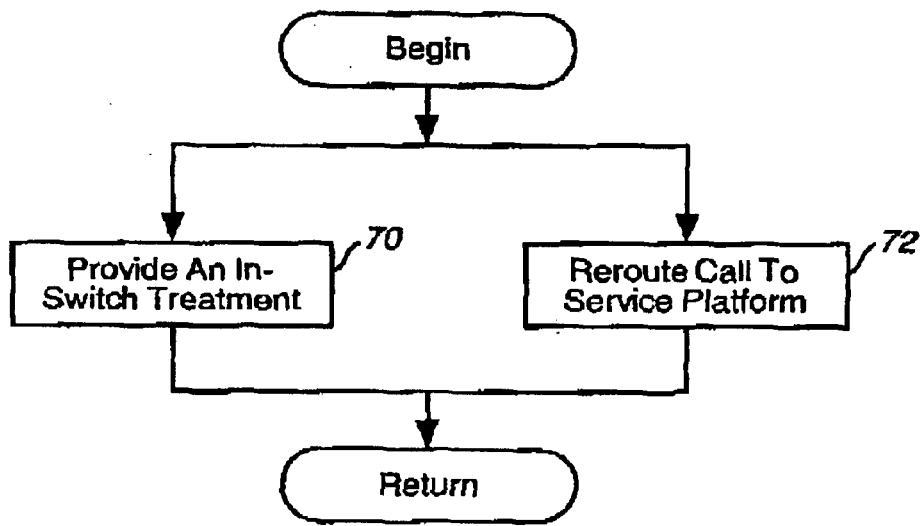
FIG. 5 illustrates several options that may be chosen when a call is to be blocked.

The processing of the feature nodes in step 60 of FIG. 4 results in a conclusion whether to block a call or not (see step 62 in FIG. 4). A number of different actions may be taken when the determination is made to block a call. The DAP 22 may provide explicit instructions within the communication that is passed the IXC switch 16 as to the steps to take. FIG. 5 sets two different options that may be applied when a call is to be blocked. These options should not be viewed as exclusive or limiting of the present invention. Other options may be selected and combinations of these options may also be used. A first option is to provide an in-switch treatment, such as returning a busy signal to the caller (step 70 in FIG. 5) or playing a switch recording. Second, the call may be rerouted to a service platform. As an example, the service platform may simply output a customized voice message to the caller.

Figure 6:
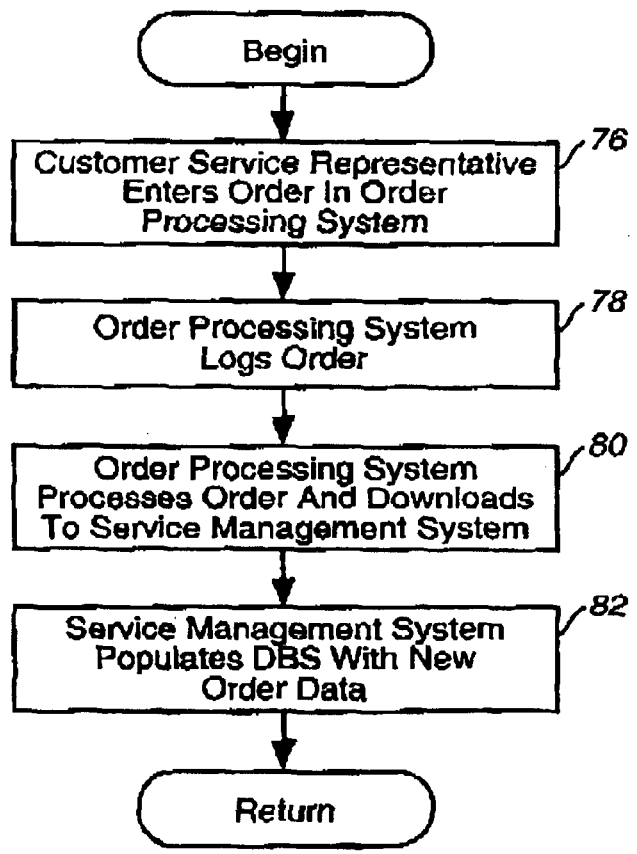
FIG. 6 is a flow chart that illustrates the steps that are performed to customize a database at a data access point per a customer request.

The selection of criteria that is to be applied in making a determination whether to block a call is customizable by the customer. The information gathered by the customer is used to build the call processing tree that is to be applied for calls to the customer's toll-free number. FIG. 6 of the flowchart illustrates the steps that are performed to customize the call processing tree. The customer may call a customer service representative or communicate via a computer connection with a customer service representative to itemize what criteria are to be applied in making a determination of whether to block a call or not (step 76 in FIG. 6). The customer service representative then enters a corresponding order via the order entry Ul 28 to the order processing system 26. The order processing system 56 is a software package that logs customer orders (step 78 in FIG. 6) and translates the orders into instructions that are passed to the SMS 24 (step 80 in FIG. 6). The SMS 24 responds to the instructions by populating the database 30 with the appropriate call processing tree. Specifically, the SMS 24 fills in the appropriate fields within the tables in the relational database (step 82 in FIG. 6).

While the present invention has been described with reference to an illustrative embodiment thereof, those skilled in the art will appreciate the various changes in form and detail may be made without departing from the intended scope of the present invention as defined in the appended claims. For example, the present invention may be applied to block calls other than those that originate from payphones. Furthermore, additional call properties may be utilized in making that determination of whether to block a call. Still further, the determination of whether to block a call need not be made by a service control point, but rather may be made by different types of intelligent nodes within a telecommunications network. The data access point need not consult a list that identifies sites from which a fraudulent call is likely to originate. In addition, the call blocking may be performed in the local exchange portion of a telephone network.

We claim:

1. In a telecommunications network, a method comprising:
   receiving a call that was initiated from a payphone;
   identifying the call as being initiated from a payphone;
   determining whether an identifier associated with the payphone is contained within a list of predetermined identifiers that identifies payphones having a potential for fraud;
   in response to the call being identified as being initiated from a payphone and the identifier associated with the payphone being contained within the list, blocking the call so that the call is not completed;
   comparing, when the identifier associated with the payphone is not contained within the list, a property associated with the call to one or more previously-stored properties; and
   blocking the call when the property corresponds to one of the one or more previously-stored properties,
   wherein the one or more previously-stored properties include information relating to geographic locations from which calls are to be blocked.

2. The method of claim 1 wherein the call was initiated to a toll-free number.

3. The method of claim 1 wherein the method further comprises the steps of storing information on a storage device wherein the information indicates whether a given automatic number identification (ANI) value is associated with a payphone and obtaining an ANI value for the call and wherein the step of identifying the call as being initiated from a payphone comprises accessing the information stored on the storage device to determine if the obtained ANI value is associated with a payphone.

4. The method of claim 1 wherein blocking the call includes providing a busy signal to the party.

5. The method of claim 1 wherein blocking the call includes providing a voice message to the party indicating that the call has been blocked.

6. In a telecommunications network, a method comprising:
   receiving a call that was initiated from a payphone;
   identifying the call as being initiated from a payphone;
   determining whether an identifier associated with the payphone is contained within a list of predetermined identifiers that identifies payphones having a potential for fraud;
   in response to the call being identified as being initiated from a payphone and the identifier associated with the payphone being contained within the list, blocking the call so that the call is not completed;
   comparing, when the identifier associated with the payphone is not contained within the list, a property associated with the call to one or more previously-stored properties; and
   blocking the call when the property corresponds to one of the one or more previously-stored properties,
   wherein the one or more previously-stored properties include information relating to time periods during which calls are to be blocked.

7. The method of claim 6 wherein the call was initiated to a toll-free number.

8. The method of claim 6 wherein the method further comprises the steps of storing information on a storage device wherein the information indicates whether a given automatic number identification (ANI) value is associated with a payphone and obtaining an ANI value for the call and wherein the step of identifying the call as being initiated from a payphone comprises accessing the information stored on the storage device to determine if the obtained ANI value is associated with a payphone.

9. The method of claim 6 wherein blocking the call includes providing a busy signal to the party.

10. The method of claim 6 wherein blocking the call includes providing a voice message to the party indicating that the call has been blocked.

11. In a telecommunications network, a method comprising:

receiving a call that was initiated from a payphone;

identifying the call as being initiated from a payphone;

determining whether an identifier associated with the payphone is contained within a list of predetermined identifiers that identifies payphones having a potential for fraud;

in response to the call being identified as being initiated from a payphone and the identifier associated with the payphone being contained within the list, blocking the call so that the call is not completed;

comparing, when the identifier associated with the payphone is not contained within the list, a property associated with the call to one or more previously-stored properties; and blocking the call when the property corresponds to one of the one or more previously-stored properties, wherein the one or more previously-stored properties include information relating to at least one day of a week during which calls are to be blocked.

12. The method of claim 11 wherein the call was initiated to a toll-free number.

13. The method of claim 11 wherein the method further comprises the steps of storing information on a storage device wherein the information indicates whether a given automatic number identification (ANI) value is associated with a payphone and obtaining an ANI value for the call and wherein the step of identifying the call as being initiated from a payphone comprises accessing the information stored on the storage device to determine if the obtained ANI value is associated with a payphone.

14. The method of claim 11 wherein blocking the call includes providing a busy signal to the party.

15. The method of claim 11 wherein blocking the call includes providing a voice message to the party indicating that the call has been blocked.

16. In a telecommunications network, a method comprising:

receiving a call that was initiated from a payphone;

identifying the call as being initiated from a payphone;

determining whether an identifier associated with the payphone is contained within a list of predetermined identifiers that identifies payphones having a potential for fraud;

in response to the call being identified as being initiated from a payphone and the identifier associated with the payphone being contained within the list, blocking the call so that the call is not completed;

comparing, when the identifier associated with the payphone is not contained within the list, a property associated with the call to one or more previously-stored properties; and blocking the call when the property corresponds to one of the one or more previously-stored properties, wherein the one or more previously-stored properties include information relating to at least one date for which calls are to be blocked.

17. The method of claim 16 wherein the call was initiated to a toll-free number.

18. The method of claim 16 wherein the method further comprises the steps of storing information on a storage device wherein the information indicates whether a given automatic number identification (ANI) value is associated with a payphone and obtaining an ANI value for the call and wherein the step of identifying the call as being initiated from a payphone comprises accessing the information stored on the storage device to determine if the obtained ANI value is associated with a payphone.

19. The method of claim 16 wherein blocking the call includes providing a busy signal to the party.

20. The method of claim 16 wherein blocking the call includes providing a voice message to the party indicating that the call has been blocked.

21. In a telecommunications network, a method comprising:

receiving a call that was initiated from a payphone;

identifying the call as being initiated from a payphone;

determining whether an identifier associated with the payphone is contained within a list of predetermined identifiers that identifies payphones having a potential for fraud;

in response to the call being identified as being initiated from a payphone and the identifier associated with the payphone being contained within the list, blocking the call so that the call is not completed;

comparing, when the identifier associated with the payphone is not contained within the list, a property associated with the call to one or more previously-stored properties; and blocking the call when the property corresponds to one of the one or more previously-stored properties, wherein the one or more previously-stored properties include information relating to a charge rate by a payphone service provider.

22. The method of claim 21 wherein the call was initiated to a toll-free number.

23. The method of claim 21 wherein the method further comprises the steps of storing information on a storage device wherein the information indicates whether a given automatic number identification (ANI) value is associated with a payphone and obtaining an ANI value for the call and wherein the step of identifying the call as being initiated from a payphone comprises accessing the information stored on the storage device to determine if the obtained ANI value is associated with a payphone.

24. The method of claim 21 wherein blocking the call includes providing a busy signal to the party.

25. The method of claim 21 wherein blocking the call includes providing a voice message to the party indicating that the call has been blocked.

26. A system for blocking calls, comprising:

a memory configured to store a list of fraudulent identifiers and one or more properties; and a node configured to:

determine whether a call originated from a payphone, determine, when the call originated from a payphone, whether an identifier associated with the payphone corresponds to one of the fraudulent identifiers in the list, block the call when the identifier corresponds to one of the fraudulent identifiers in the list, compare, when the identifier associated with the payphone does not correspond to the fraudulent identifiers in the list, a property associated with the call to the one or more stored properties, and block the call when the property corresponds to one of the one or more stored properties, wherein the one or more stored properties include information relating to geographic locations from which calls are to be blocked.

27. The system of claim 26 further comprising:

an interface configured to allow a user to store the one or more properties in the memory.

28. The system of claim 26 wherein the memory is further configured to store a parameter indicating that conditional or unconditional call blocking is to be performed.

29. The system of claim 28 wherein the node is further configured to:

read the parameter when the identifier associated with the payphone does not correspond to the fraudulent identifiers in the list, block the call when the parameter indicates that unconditional blocking is to be performed, and block the call, when the parameter indicates that conditional blocking is to be performed, if a property associated with the call corresponds to any of the one or more stored properties.

30. A system for blocking calls, comprising:

a memory configured to store a list of fraudulent identifiers and one or more properties; and a node configured to:

determine whether a call originated from a payphone, determine, when the call originated from a payphone, whether an identifier associated with the payphone corresponds to one of the fraudulent identifiers in the list, block the call when the identifier corresponds to one of the fraudulent identifiers in the list, compare, when the identifier associated with the payphone does not correspond to the fraudulent identifiers in the list, a property associated with the call to the one or more stored properties, and block the call when the property corresponds to one of the one or more stored properties, wherein the one or more stored properties include information relating to time periods during which calls are to be blocked.

31. The system of claim 30 wherein the memory is further configured to store a parameter indicating that conditional or unconditional call blocking is to be performed.

32. The system of claim 31 wherein the node is further configured to:

read the parameter when the identifier associated with the payphone does not correspond to the fraudulent identifiers in the list, block the call when the parameter indicates that unconditional blocking is to be performed, and block the call, when the parameter indicates that conditional blocking is to be performed, if a property associated with the call corresponds to any of the one or more stored properties.

33. A system for blocking calls, comprising:

a memory configured to store a list of fraudulent identifiers and one or more properties; and a node configured to:

determine whether a call originated from a payphone, determine, when the call originated from a payphone, whether an identifier associated with the payphone corresponds to one of the fraudulent identifiers in the list, block the call when the identifier corresponds to one of the fraudulent identifiers in the list, compare, when the identifier associated with the payphone does not correspond to the fraudulent identifiers in the list, a property associated with the call to the one or more stored properties, and block the call when the property corresponds to one of the one or more stored properties, wherein the one or more stored properties include information relating to at least one day of a week during which calls are to be blocked.

34. The system of claim 33 wherein the memory is further configured to store a parameter indicating that conditional or unconditional call blocking is to be performed.

35. The system of claim 34 wherein the node is further configured to:

read the parameter when the identifier associated with the payphone does not correspond to the fraudulent identifiers in the list, block the call when the parameter indicates that unconditional blocking is to be performed, and block the call, when the parameter indicates that conditional blocking is to be performed, if a property associated with the call corresponds to any of the one or more stored properties.

36. A system for blocking calls, comprising:

a memory configured to store a list of fraudulent identifiers and one or more properties; and a node configured to:

determine whether a call originated from a payphone, determine, when the call originated from a payphone, whether an identifier associated with the payphone corresponds to one of the fraudulent identifiers in the list, block the call when the identifier corresponds to one of the fraudulent identifiers in the list, compare, when the identifier associated with the payphone does not correspond to the fraudulent identifiers in the list, a property associated with the call to the one or more stored properties, and block the call when the property corresponds to one of the one or more stored properties, wherein the one or more stored properties include information relating to at least one date for which calls are to be blocked.

37. The system of claim 36 wherein the memory is further configured to store a parameter indicating that conditional or unconditional call blocking is to be performed.

38. The system of claim 37 wherein the node is further configured to:

read the parameter when the identifier associated with the payphone does not correspond to the fraudulent identifiers in the list, block the call when the parameter indicates that unconditional blocking is to be performed, and block the call, when the parameter indicates that conditional blocking is to be performed, if a property associated with the call corresponds to any of the one or more stored properties.

39. A system for blocking calls, comprising:

a memory configured to store a list of fraudulent identifiers and one or more properties; and a node configured to:

determine whether a call originated from a payphone, determine, when the call originated from a payphone, whether an identifier associated with the payphone corresponds to one of the fraudulent identifiers in the list, block the call when the identifier corresponds to one of the fraudulent identifiers in the list, compare, when the identifier associated with the payphone does not correspond to the fraudulent identifiers in the list, a property associated with the call to the one or more stored properties, and block the call when the property corresponds to one of the one or more stored properties, wherein the one or more stored properties include information relating to a charge rate by a payphone service provider.

40. The system of claim 39 wherein the memory is further configured to store a parameter indicating that conditional or unconditional call blocking is to be performed.

41. The system of claim 40 wherein the node is further configured to:

read the parameter when the identifier associated with the payphone does not correspond to the fraudulent identifiers in the list, block the call when the parameter indicates that unconditional blocking is to be performed, and block the call, when the parameter indicates that conditional blocking is to be performed, if a property associated with the call corresponds to any of the one or more stored properties.

* * * * *